United States Patent [19]
Hoeber et al.

[11] Patent Number: 5,347,626
[45] Date of Patent: Sep. 13, 1994

[54] METHOD AND APPARATUS FOR SELECTING AND EXECUTING DEFAULTS IN WINDOW BASED DISPLAYED SYSTEM

[75] Inventors: Anthony Hoeber, Woodside; Alan Mandler, San Francisco, both of Calif.; Norman Cox, Irving, Tex.

[73] Assignee: Sun Microsystems, Inc., Mountain View, Calif.

[21] Appl. No.: 66,328

[22] Filed: May 21, 1993

Related U.S. Application Data

[63] Continuation of Ser. No. 323,775, Mar. 15, 1989, abandoned.

[51] Int. Cl.$^5$ .............................................. G06F 3/14
[52] U.S. Cl. ..................................................... 395/156
[58] Field of Search ............................ 395/155–161, 395/153, 700; 340/709–710, 706, 747, 750

[56] References Cited

U.S. PATENT DOCUMENTS

| | | | |
|---|---|---|---|
| Re. 32,632 | 3/1988 | Atkinson | 340/709 |
| 4,533,910 | 8/1985 | Sukonick et al. | 340/721 |
| 4,555,775 | 11/1985 | Pike | 364/900 |
| 4,622,545 | 11/1986 | Atkinson | 340/747 |
| 4,712,191 | 12/1987 | Penna | 395/159 |
| 4,748,618 | 5/1988 | Brown et al. | 370/94 |
| 4,785,408 | 11/1988 | Britton et al. | 364/513 |
| 4,812,834 | 3/1989 | Wells | 340/721 |
| 4,847,604 | 7/1989 | Doyle | 340/706 |
| 4,884,223 | 11/1989 | Ingle et al. | 364/550 |
| 4,896,291 | 1/1990 | Gest et al. | 395/156 |
| 4,899,136 | 2/1990 | Beard et al. | 340/706 |
| 4,914,732 | 4/1990 | Henderson et al. | 340/825 |
| 4,931,783 | 6/1990 | Atkinson | 340/710 |
| 4,935,865 | 6/1990 | Rowe et al. | 364/188 |
| 4,939,507 | 7/1990 | Beard et al. | 340/706 |
| 5,008,853 | 4/1991 | Bly et al. | 395/153 |
| 5,072,412 | 12/1991 | Henderson, Jr. et al. | |
| 5,079,695 | 1/1992 | Dysart et al. | 395/700 |
| 5,119,475 | 6/1992 | Smith et al. | 395/156 |

FOREIGN PATENT DOCUMENTS 0239884 10/1987 European Pat. Off. ....... G09B 5/06

OTHER PUBLICATIONS

*HyperCard User's Guide*, Apple Computer, Inc., 1988, pp. 1–19, 32–63, 72–81, 120–129, 146–161.
"MacIntosh System Software User's Guide", v. 6.0, Apple Computer, Inc., 1988, pp. 14–25, 194–198.

(List continued on next page.)

*Primary Examiner*—Gary V. Harkcom
*Assistant Examiner*—John Earl Breene
*Attorney, Agent, or Firm*—Blakely Sokoloff Taylor & Zafman

[57] ABSTRACT

The invention is an object-oriented graphic user interface for use in computer controlled display systems, and in particular, display systems having object oriented graphic interfaces. A central processing unit (CPU) is provided and is coupled to a display for displaying graphic and other data. The CPU is further coupled to a cursor control device which permits a user to selectively position a cursor at a desired location on the display, and signal the CPU of selections in accordance with the teachings of the present invention. Buttons are generated by the CPU and displayed which correspond to either a single function to be executed by the CPU, or a button stack which has associated therewith a plurality of functions disposed on a menu. The menu includes a plurality of buttons and/or button stacks. A button stack may be provided with a default function which is automatically executed by the CPU when a predetermined signal is provided by the user through the cursor control device. To select and execute a button stack default, a user places the cursor over the right half of a desired button stack and momentarily depresses a switch on the cursor control device, the default function is then executed without the need to choose the function from the button stack menu. Placement of the cursor over the left half of the button stack and depressing the cursor control switch, results in the display of the full button stack menu.

4 Claims, 7 Drawing Sheets

OTHER PUBLICATIONS

Alexander, "Visualizing Cleared-Off Desktops" *Computer World,* May 6, 1991, p. 20.

Article entitled: Learning Considerations In User Interface Design: The Room Model; author: Patrick P. Chan; publication of the Software Portability Laboratory, University of Waterloo, Waterloo, Ontario, Canada, Jul., 1984.

Article entitled: Creation/Modification of the Audio Signal Processor Setup For A PC Audio Editor; publication of International Business Machines, IBM Technical Disclosure Bulletin, vol. 30, No. 10, Mar. 1988.

Article entitled: Browsing Within Time-Driven Multimedia Documents; authors: Stavros Christodoulakis and Steven Graham; publication of the Institute for Computer Research, University of Waterloo, Waterloo, Ontario, Canada, Jul., 1988.

METHOD AND APPARATUS FOR SELECTING AND EXECUTING DEFAULTS IN WINDOW BASED DISPLAYED SYSTEM

This patent is continuation of U.S. patent application Ser. No. 07/323,775, filed on Mar. 15, 1989 now abandoned.

The present application is related to U.S. patent application, Ser. No. 07/619,665, filed Nov. 28, 1990 which is a continuation of U.S. patent application Ser. No. 07/323,774, filed Mar. 15, 1989, and U.S. Pat. No. 5,157,768, issued Oct. 20, 1992 which issued from U.S. patent application Ser. No. 07/703,036, filed May 17, 1991, which was a continuation of U.S. patent application Ser. No. 07/323,669, filed Mar. 15, 1989, and hereby refers to, and incorporates by reference the contents of the above-referenced patent application and patent.

BACKGROUND OF THE INVENTION

1. Field of the Invention

The present invention relates to apparatus and methods for displaying and manipulating graphic information, and more particularly, the present invention relates to a computer controlled display system for selecting control functions, and retaining desired data disposed in a menu on a display regardless of other display operations in process.

2. Art Background

It is common for computer display systems to represent and convey information to a user through various graphic representations of data. Representations of data may take a variety of forms, such as for example, alphanumeric characters, Cartesian graphs, as well as shapes of well known physical objects. Today, many computer systems utilize one of a variety of object oriented user interfaces in which many previously coded programming commands are replaced with two or three dimensional graphic images on a computer display. The object oriented system utilizes various icons which symbolically indicate the type of operation the computer system will execute if the icon function is chosen. In addition, many object oriented interfaces utilize multiple "windows" displayed on the cathode ray tube (CRT) display in which combinations of text and graphics are used to convey information to a user. Each window may take the form of a variety of objects such as a file folder, loose-leaf binder, or simple rectangle, and the windows may overlap one another with the "top" window fully visible and constituting the current work file. The user may delete information from a window, move data from one window to another, and generally operate on the window as if an actual file in an office is being used. Thus the user is permitted to operate on and manipulate the window contents, and the window itself, as if the image constituted an actual object. Numerous object oriented systems exist today and are displayed on computers manufactured by the assignee: Sun Microsystems, Inc., as well as other manufacturers, including: International Business Machines, Apple Computer, Inc., and others. [See, D. Robson, "Object Oriented Software Systems", BYTE, August 1981, pg. 74, Vol. 6, No. 8; and L. Tesler, "The Small Talk Environment", BYTE, August 1981, pg. 90, Vol. 6, No. 8.See also, U.S. Pat. No. Re.32,632, reissued Mar. 29, 1988.]

Although a variety of object oriented interfaces have been developed by various computer manufacturers, the various methods by which a user interfaces with the computer display system varies significantly between machines. In addition, the functionality of the graphic interface of a computer system significantly impacts the efficiency and ease of use of the particular computer. It has been found that certain features are desirable to be incorporated into the graphic interface of object oriented computer display systems, and the present invention discloses one such significant improvement to permit a user to select button control functions, and retain certain data on the display regardless of other display operations being performed by the computer system. As will be described, the present invention provides apparatus and methods which permit a user to choose a particular object oriented function which results in the generation and display of a "menu" on the display. The present invention further permits the user to retain the contents of the selected menu on the display while the display system is performing other unrelated operations.

SUMMARY OF THE INVENTION

An apparatus and method is disclosed which has application for use in computer controlled display systems, and in particular, display systems having object oriented graphic interfaces. A central processing unit (CPU) is provided and is coupled to a display for displaying graphic and other data. The CPU is further coupled to a cursor control device which permits a user to selectively position a cursor at a desired location on the display, and signal the CPU of selections in accordance with the teachings of the present invention. Buttons are generated by the CPU and displayed which correspond to either a single function to be executed by the CPU, or a button stack which has associated therewith a plurality of functions disposed on a menu. The menu includes a plurality of buttons and/or button stacks. A button stack may be provided with a default function which is automatically executed by the CPU when a predetermined signal is provided by the user through the cursor control device. To select and execute a button stack default, a user places the cursor over the right half of a desired button stack and momentarily depresses a switch on the cursor control device, the default function is then executed without the need to choose the function from the button stack menu. Placement of the cursor over the left half of the button stack and depressing the cursor control switch, results in the display of the full button stack menu.

NOTATION AND NOMENCLATURE

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, icons, characters, terms, numbers, or the like. It should be borne in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein, which form part of the present invention; the operations are machine operations, although when dealing with a graphic interface, by its nature, the man/machine interface utilizes some form of human input. Useful machines for performing the operations of the present invention include general purpose digital computers or other similar devices, such as, for example, those manufactured by the assignee, Sun Microsystems, Inc. In all cases there should be borne in mind the distinction between the method operations and operating a computer and the method of computation itself. The present invention relates to apparatus and methods for operating a computer and processing electrical or other physical signals to generate other desired results.

The present invention also relates to apparatus for performing these operations. This apparatus may be specially constructed for the required purpose or it may comprise a general purpose computer as selectively activated or reconfigured by a computer program stored in the computer. The images, algorithms, and data structures presented herein are not inherently related to any particular computer or other apparatus. In particular, various general purpose machines may be used with programs written in accordance with the teachings herein, or it may prove more convenient to construct more specialized apparatus to perform the required method steps. In addition, no particular programming language has been indicated for carrying out the various procedures described herein. This is due in part that the fact that not all languages that might be mentioned are universally available. Each user of a particular computer will be aware of the language which is most suitable for his immediate purposes. In practice it has been proven useful to substantially implement the present invention in an assembly language which provides a machine executable object code. Accordingly, no detailed program listings have been provided. It is considered that the operations and other procedures described herein and illustrated in the accompanying drawings are sufficiently disclosed to permit one of ordinary skill to practice the instant invention or so much of it as is of use to him/her.

DETAILED DESCRIPTION OF THE INVENTION

The present invention discloses apparatus and methods for selecting a function control and retaining desired data on a display regardless of other computer operations which may occur. In particular, the present invention discloses an unique graphic interface in which the user may choose a function default, as well as selectively retain data on the display during other computer operations. In the following description, numerous specific details are set forth such as computer display system elements, display formats, sample data, etc. in order to provide a more thorough understanding of the present invention. However, it will be apparent to one skilled in the art that the present invention may be practiced without these specific details. In other instances, well known circuits and structures are not described in detail in order not to obscure the present invention unnecessarily.

Figures 1, 2:
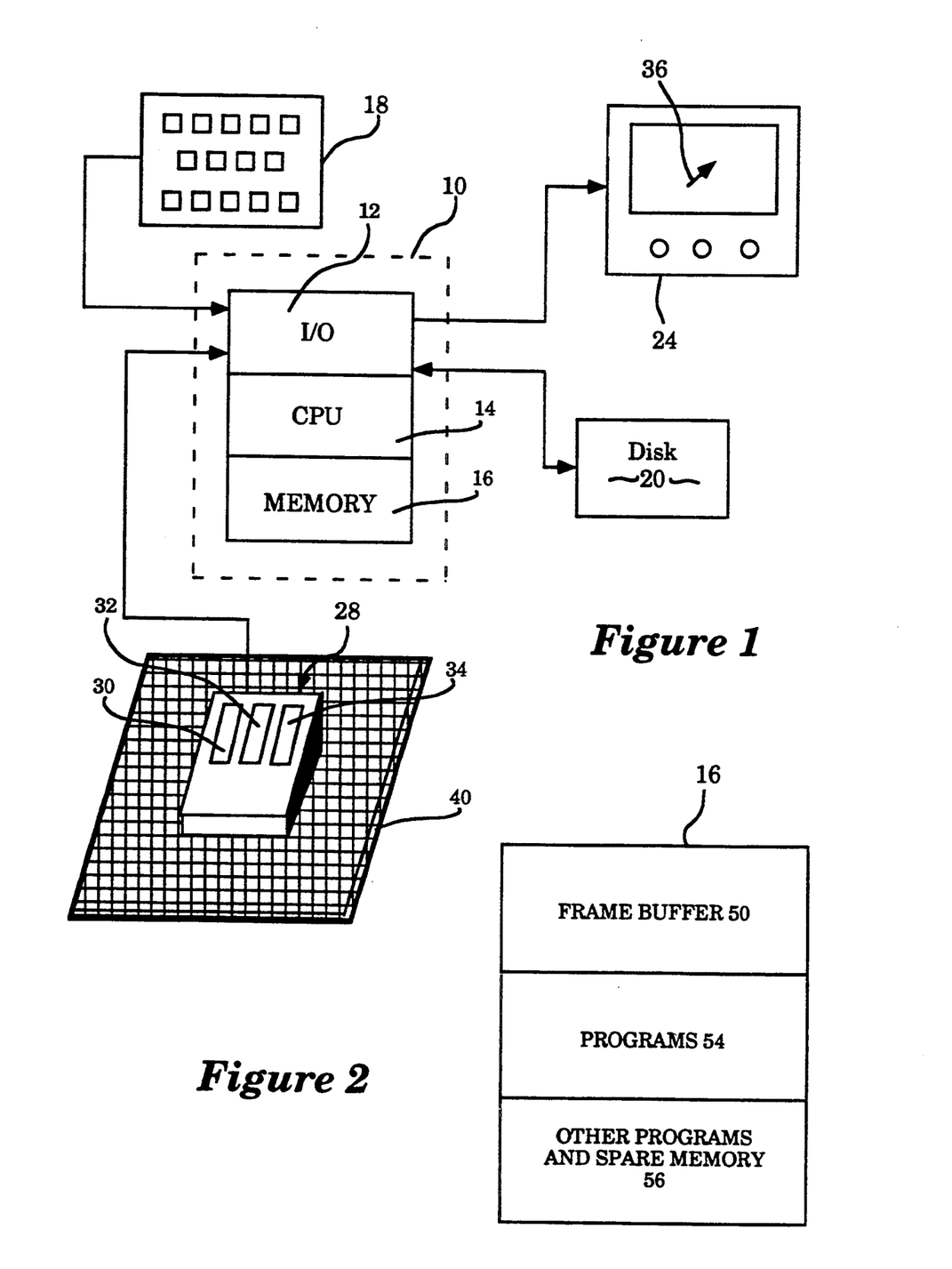
FIG. 1 illustrates a computer incorporating the teachings of the present invention.
FIG. 2 shows one arrangement of program storage for the system of FIG. 1.

FIG. 1 illustrates a computer based system for generating graphic images in accordance with the teachings of the present invention. Shown is a computer 10 which comprises three major components. The first of these is an input/output (I/O) circuit 12 which is used to communicate information in appropriately structured form to and from other portions of the computer 10. In addition, computer 10 includes a central processing unit (CPU) 14 coupled to the I/O circuit 12 and a memory 16. These elements are those typically found in most general purpose computers and, in fact, computer 10 is intended to be representative of a broad category of data processing devices. Also shown in FIG. 1 is a keyboard 18 to input data and commands into computer 10, as is well known. A magnetic disk 20 is shown coupled to I/O circuit 12 to provide additional storage capability for the computer 10. It will be appreciated that additional devices may be coupled to computer 10 for storing data such as magnetic tape drives, bubble memory devices, as well as networks which are in turn coupled to other data processing systems. As is well known, disk 20 may store other computer programs, characters, routines, etc., which may be accessed and executed by CPU 14. A raster display monitor 24 is shown coupled to the I/O circuit 12 and is used to display images generated by CPU 14 in accordance with the present invention. Any well known variety of cathode ray tube (CRT) display may be utilized as display 24. A cursor control device 28 is also shown coupled to computer 10 through I/O circuit 12. Cursor control device 28 includes switches 30, 32 and 34 for signalling CPU 14 in accordance with the teachings of the present invention. Cursor control device 28 (commonly known as a "mouse") permits a user to select various command modes, modify graphic data, and input other data utilizing switches 30, 32 and 34. More particularly, cursor control device 28 permits a user to selectively position a cursor 36 at any desired location on display 24 by movement of the cursor control device 28 over a surface 40. In the presently preferred embodiment, cursor control 28 utilizes a well known optical method for signalling CPU 14 of positional changes of cursor 36 by movement of cursor control over a grid disposed on surface 40. However, it will be appreciated that a variety of well known cursor control devices may be utilized by the present invention, including other cursor control devices such as mechanical mice, track balls, joy sticks, etc.

FIG. 2 shows one arrangement of major programs contained within the memory 16 illustrated in FIG. 1. In particular, there is shown a frame buffer 50, which comprises a bit map of display 24. The frame buffer 50 represents the video memory for the display 24, wherein, each storage location in the frame buffer 50 corresponds to a pixel on the display 24. Thus, the frame buffer comprises a two dimensional array of points having known coordinates corresponding to the pixels on the raster display. In its simplest form, frame buffer 50 comprises a contiguous block of memory which is allocated such that each memory location is mapped onto the corresponding pixel on the rastor display 24. Memory 16 also includes a variety of other programs 54 for execution by the CPU 14. For example, a variety of control, display, and calculating programs implementing the operations and routines described in this Specification may be stored in memory 16, as well as monitor control programs and disk operating systems. Moreover, memory 16 further includes space for other programs and spare memory (56) which may be used for a variety of other well known functions and operations in data processing systems.

Figure 3A:
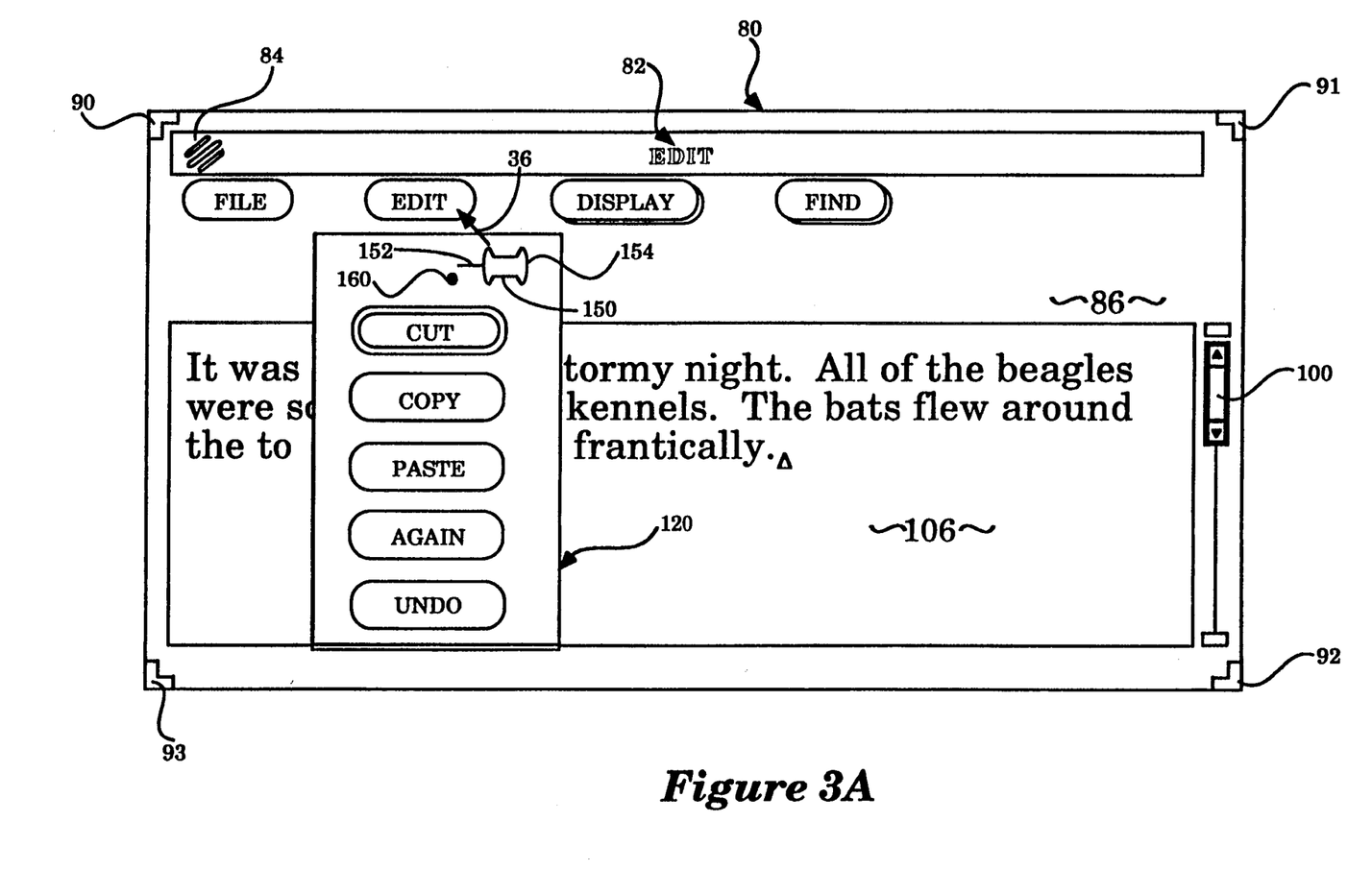
FIGS. 3(a)-(c) graphically illustrate the operation of the present invention in its preferred form.

Referring now to FIG. 3(a), in the presently preferred embodiment, a variety of "windows" may be displayed on display 24. As shown in FIG. 3(a), a representative window includes a variety of data within the bounded window, in the form of graphics, text and symbols. For example, in FIG. 3(a) there is shown a representative window identified generally by the numeral 80, which is in the form of a rectangular area on display 24. In the example of FIG. 3(a), window 80 includes a window title 82 (in the present example "edit") and a window mark 84 which is displayed at the left side of the header in the window. By placing cursor 36 on the window mark 84, and momentarily activating cursor control switch 30, the window is "dismissed" and closed. Once closed, the window 80 is no longer displayed on display 24. A control area 86 is provided for the display of button functions, which will be described in more detail below. Window 80 further includes resize corners 90 through 93 which are used to shrink or expand the borders of window 80, thereby changing the area of the window without changing the relative size of the controls, fonts, icons, etc. displayed within window 80. CPU 14 further displays the image of a vertical scroll bar 100, as shown, which permits text, graphics and the like within the working area 106 of window 80 to be scrolled in the direction in which the scroll bar is "pulled". The scroll bar, in the presently preferred embodiment may be moved by placing cursor 36 over the arrows [see FIG. 3(a)] of the scroll bar and activating a selected switch on cursor control device 28, or alternatively, by placing the cursor 36 on the scroll bar, depressing a preselected switch on cursor control 28, and moving the cursor control device in the direction in which the text or the like within the working area 106 is to be scrolled. Although not shown, window 80 may also incorporate the use of a horizontal scroll bar to selectively scroll horizontally through the text, graphics, etc. disposed within the working area 106.

As shown in FIG. 3(a), a plurality of button functions may be disposed within window 80. Although the button functions (in the present example entitled: "file", "edit", "display", and "find") are illustrated in area 86, the button control functions may be displayed in other control areas as well as on menus, as will be described below. Although illustrated horizontally, button functions may also be arrayed vertically within the window, and button function names may be in the form of text and/or graphics. In the presently preferred embodiment, button functions may take the form of a single button function or button stacks. A single button function is used for a single command to be executed by CPU 14 (for example "copy"), wherein a button stack is used to group commands together in logical sets on a menu which is displayed when the particular button stack is chosen by a user. Typically, the label on the button stack is the title of the group of commands on the menu and submenus, and not one of the commands (for example, "edit").

Figure 5:
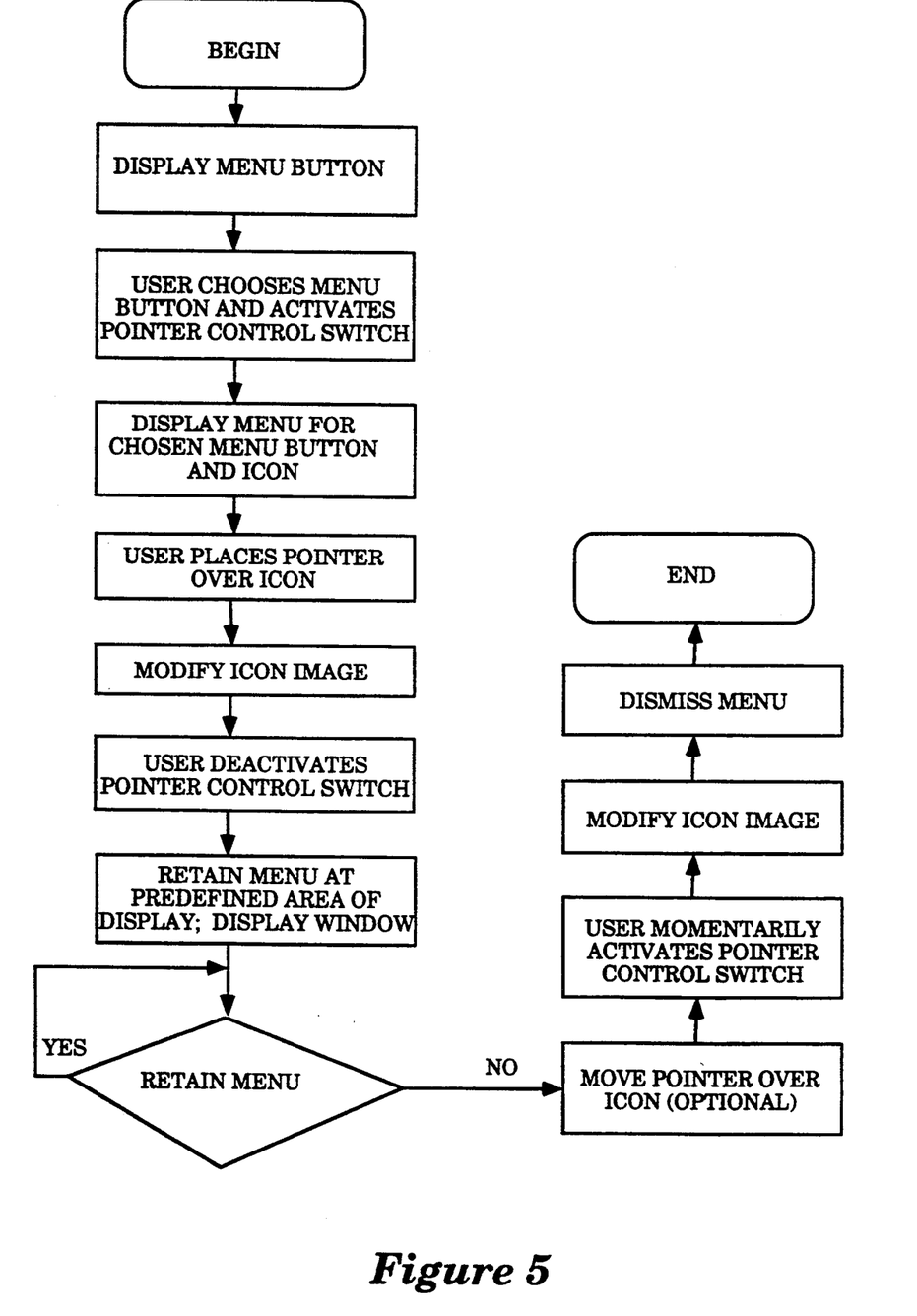
FIG. 5 is a flow chart illustrating the sequence of steps utilized by the present invention to retain specified data on the display, regardless of other display operations.

As shown in FIG. 3(a), and illustrated in the flow chart of FIG. 5, appropriate programming of computer 10 is provided such that a plurality of button stacks and/or buttons are displayed within window 80. In the example of FIG. 3(a), window 80 includes four button stacks, identified as "edit", "file", "display" and "find". The placement of cursor 36, over the "edit" button stack of FIG. 3(a) by a user utilizing cursor control device 28, and the activation of a switch (for example, switch 34) on the cursor control device 28 by a user, results in computer 10 generating and displaying a menu 120 below the corresponding button stack (in the present example, "edit") as illustrated. As shown, menu 120 includes a plurality of single button functions which correspond to executable functions by CPU 14. In the present example, buttons disposed within menu 120 include such functions as "cut", "copy", "paste", "again" and "undo", which may be chosen by a user utilizing cursor control device 28. The selection of any of these button functions by a user results in the immediate execution of the function by CPU 14.

Frequently, the commands corresponding to the buttons on a menu are required by a user throughout a variety of operations of the display system of the present invention. As is known, in many prior art systems the selection of a command function on a menu results in the immediate execution of the selected command and the dismissal of the menu such that it is no longer displayed to the user. Accordingly, in order to perform additional functions requiring the buttons disposed within menu 120, the user must once again choose the edit button function using cursor 36 as well as the particular command button on menu 120 which is desired. As will be described more fully below, the present invention permits button stacks [such as "edit" in FIG. 3(a)] to include a default function which may be previewed by a user prior to execution (see FIGS. 6 and 7) without the necessity of displaying the menu associated with the particular button stack.

Figure 3B:
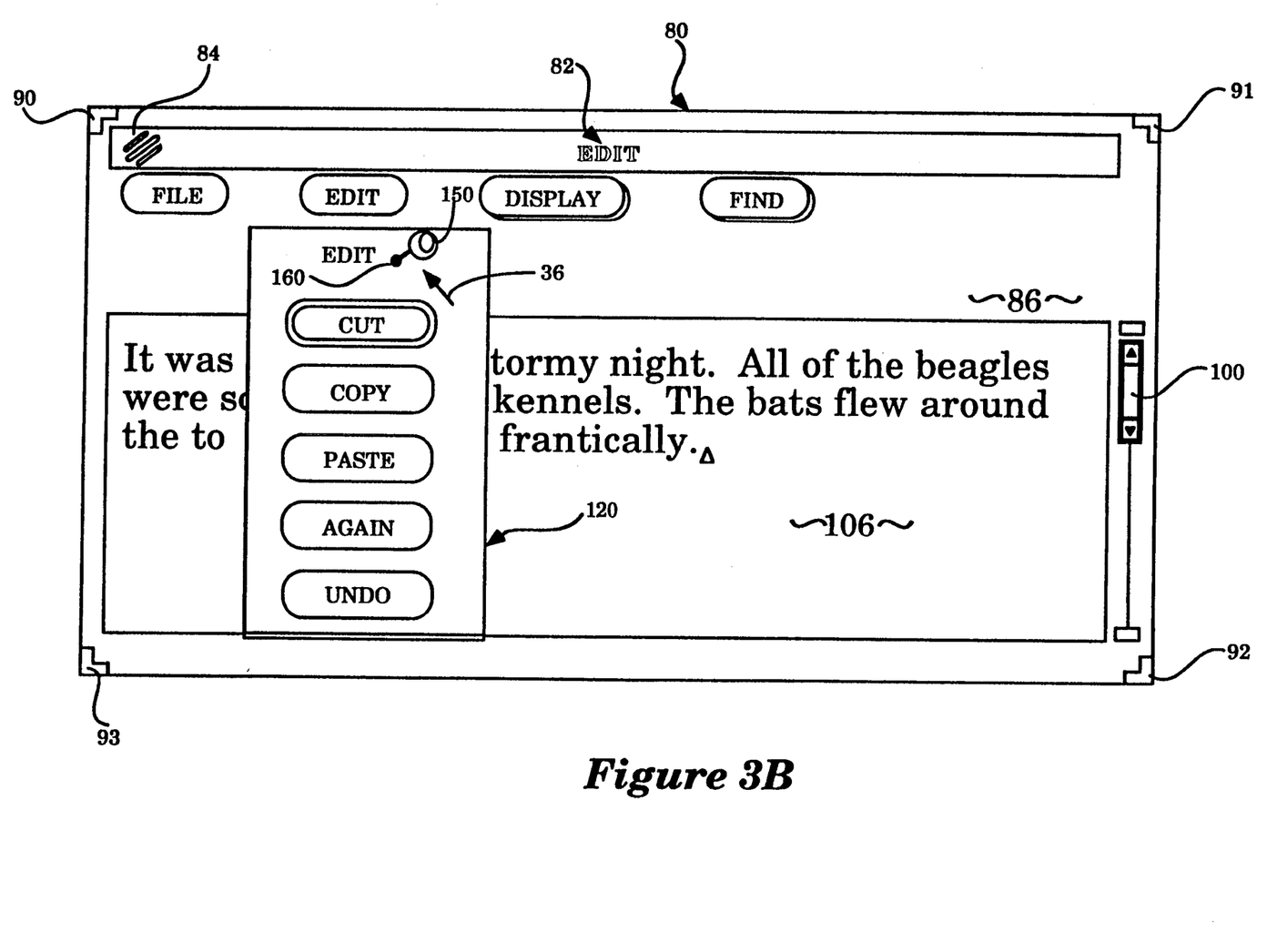
Figure 3C:
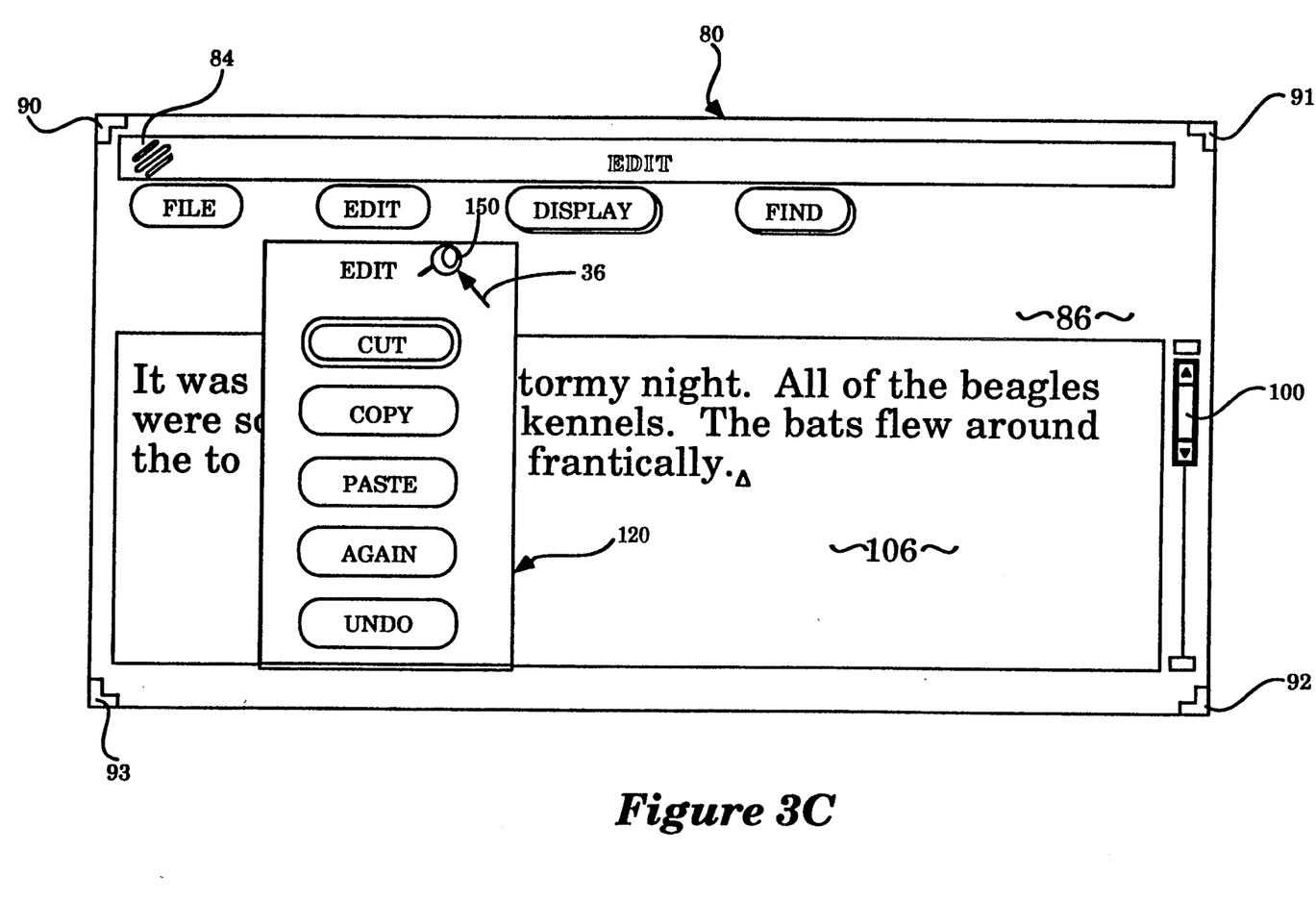

To avoid the inefficient and time consuming requirement of reselecting a particular button function within window 80 to execute a particular command disposed within a menu (such as menu 120), the present invention incorporates an apparatus and method to retain the menu on the display 24 regardless of other operations executed by computer 10 for display. In accordance with the teachings of the present invention, an icon 150 is provided, and is shown in FIGS. 3(a)-3(c), which may be selected by a user using cursor control device 28 to retain the menu on the display. If the user desires to retain a menu (for example menu 120) on display 24, the button function is chosen by placing the cursor 36 over the particular button function desired. The user than signals CPU 14 of the selection by depressing a switch disposed on cursor control device 28 (switch 34). The CPU 14 displays the corresponding menu, as well as icon 150. As illustrated, in the presently preferred embodiment icon 150 takes the form of a "push pin" including a pin 152 and a pin head 154. In addition, in the presently preferred embodiment computer 14 further displays a darkened dot 160 symbolically illustrating a pin hole.

Subsequent to the selection of a button function (for example the "edit function") and before choosing a button function on the menu, the user "drags" the cursor 36 down such that it is over at least a portion of icon 150. As illustrated in FIG. 3(b), once cursor 36 has been dragged to overlay at least a portion of icon 150, CPU 14 modifies the icon image such that it appears to the user that the pin 152 has been inserted into pin hole 160, thereby conceptually "pinning" the menu 120 onto the display 24.

Figure 4:
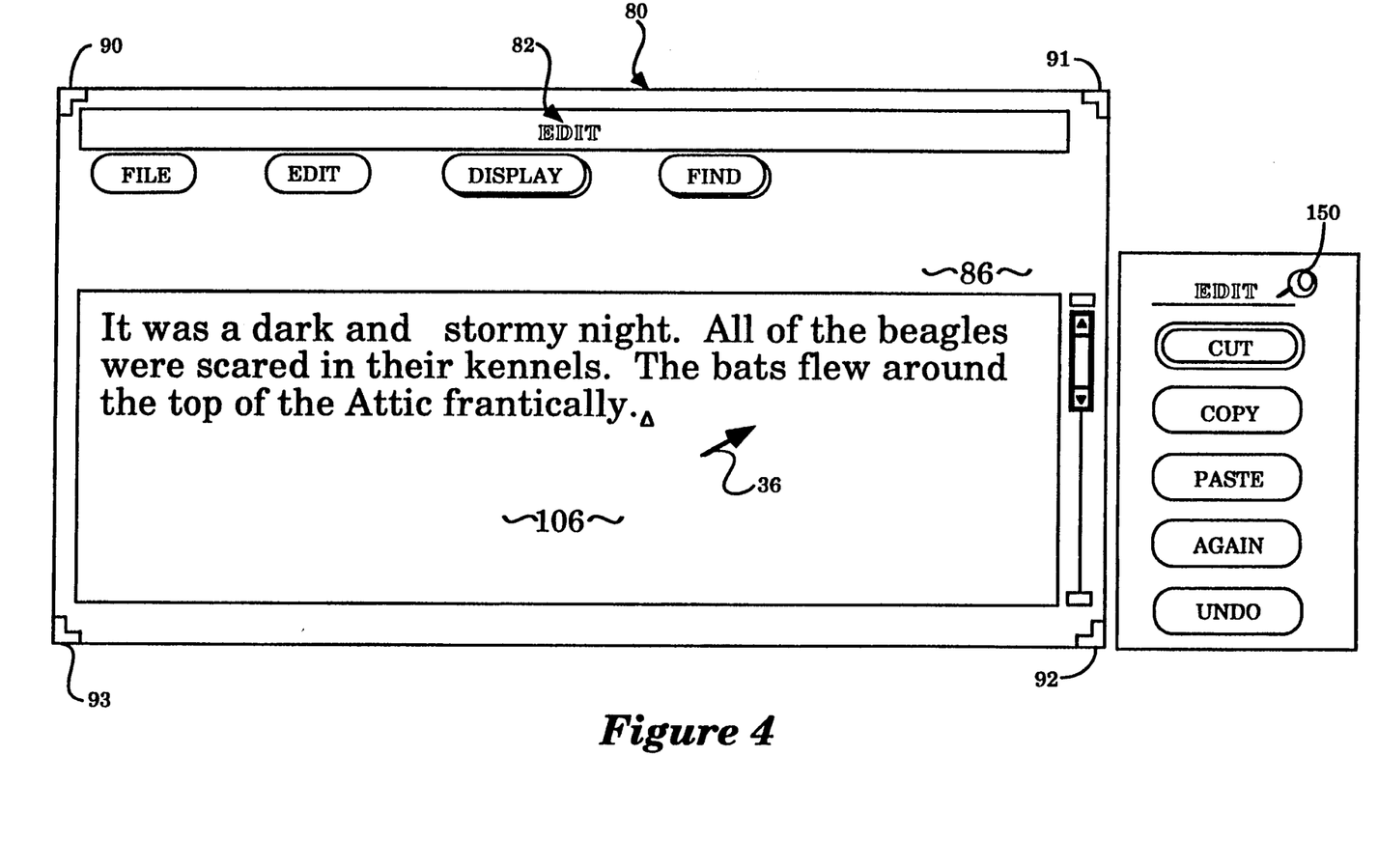
FIG. 4 illustrates an additional feature of the present invention wherein selected data is displayed in a separate predefined area of the screen.

As shown in FIG. 3(c), the deactivation of the cursor control switch (for example switch 32) notifies CPU 14 of the selection of icon 150 and CPU 14 then retains menu 120 on display 24, as will be described. The selection of icon 154 converts the menu 120 into a window. For purposes of this Specification, the converted menu 120 is referred to as the "menu (window) 120". As illustrated in FIG. 3(c), CPU 14 displays the title of the button function corresponding to menu (window)1 20 (in a present example "edit") at the top of the window. As a window, the menu 120 may be manipulated on the display 24 like any other window. For example, the window may be repositioned on the display using the cursor control device 28. The movement of the menu (window) to another location on the display is illustrated in FIG. 4. In addition, other types of windows may include push pins, such as pop-up windows. A pop-up window is a transistory window that is displayed to permit the user to fill in information or make choices. Pop-up windows usually have a push pin (icon 150) so that the window may be "pinned" to the screen.

Referring now to FIG. 5 in conjunction with FIG. 4, if a user desires to no longer retain menu (window) 120 on display 24, then to dismiss the menu (window) 120 such that it is no longer displayed, he must place cursor 36 over the push pin, and momentarily activate a cursor control switch on cursor control device 28. The menu 120 will then no longer be displayed unless the original button function (in the present example "edit") is again chosen by the user. In the case of a pop-up window, the "unpinning" of the pop-up window 120 does not result in its immediate dismissal and non-display. Rather, the pop-up window will continue to be displayed until the next operation of the display system, at which point the pop-up window will be dismissed.

Referring now to FIGS. 6 and 7(a)–(c) the present invention permits button stacks to include a default function which is automatically executed by the CPU 14 when a predefined signal originating from cursor control 28 (switch 30) is provided by a user. Button stack defaults provide a quick and convenient way for a user to perform a function while still providing the flexibility to permit the user to make a different choice from a menu, or quickly change the default setting. A default setting may be provided for any button stack, including button stacks in control areas such as the "edit" button stack illustrated in FIG. 3(a), and the "cut" button stack disposed on the menu 120.

Figure 6:
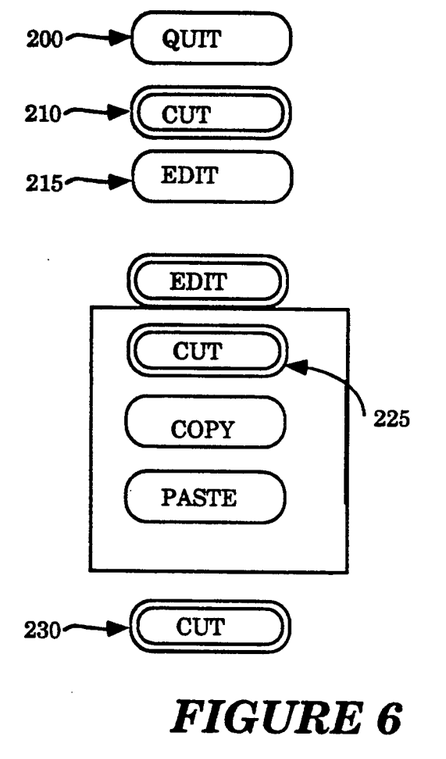
FIG. 6 illustrates the present invention's visual feedback for button function controls.

As best shown in FIG. 6, a button function is illustrated and identified by the numeral 200. As previously described, button functions are used for single commands to be executed by the CPU. The title (for example in FIG. 6, "quit") is the name of the button function to be executed. Button functions may be disposed within a window singly, or arrayed in horizontal or vertical groups. As illustrated in the figures, if a user places cursor 36 over at least a portion of the button function and chooses the button function by, for example, depressing a switch on the cursor control device 28, CPU 14 highlights the button function. An example of a highlighted button function is shown in FIG. 6, and identified by the numeral 210. Similarly, a button stack is identified by a back shadow as shown in FIG. 6 by the numeral 215. By placing the cursor 36 over at least a portion of the button stack illustrated in FIG. 6, numeral 215, a button stack menu is generated corresponding to the button stack chosen, and described more fully above with reference to FIGS. 3(a)–3(c) relating to the button stack "edit".

As illustrated in FIG. 6, a button stack which includes a default setting is identified by a default ring shown, for example in FIG. 6, for the "cut" button stack, and identified by numeral 225. The numeral 230 identifies another button stack for "cut" also utilizing a default ring.

Figure 7A:
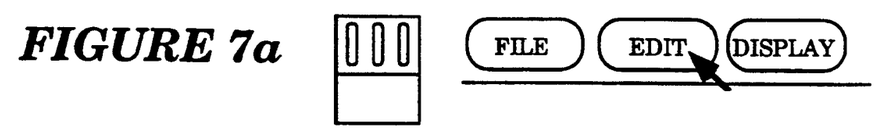
FIGS. 7a-c illustrate the viewing of a button function default utilizing the teachings of the present invention.
Figure 7B:
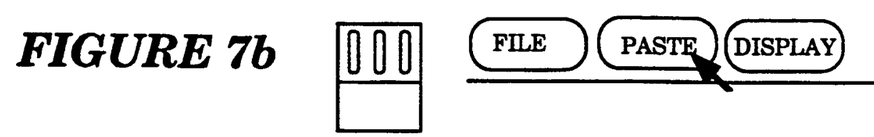
Figure 7C:
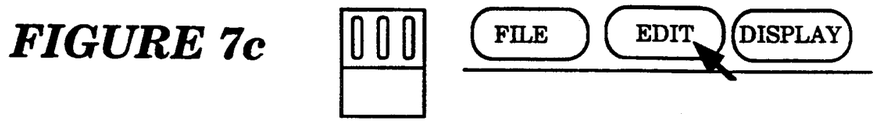

With reference now to FIGS. 7 (a)–(c) and 3(a)–(c), the present invention's use of a button stack default is described, which permits and combines menu and command mechanisms into a single user action. As best shown in FIGS. 3(a) –(c), the selection of the "edit" button stack results in the display of menu 12 which includes a button entitled "paste". A user desiring to execute the "paste" command must first choose the "edit" button stack and then place the cursor over at least a portion of the button entitled "paste", and signal the computer of the selection as described relative to FIGS. 3(a)–(c). However, the present invention permits the user to select, for example, a function "paste" as the default setting for the button stack "edit". In order to execute the "paste" default command in the present example, the user simply places the cursor 36 over a predetermined portion of the "edit" button stack, and depresses a predetermined switch (for example, switch 30) on cursor control device 28. CPU 14, sensing the activation of switch 30, displays the title of the default function in a shade other than the shade of the original button stack (in the present example "paste") within the selected button, such that the shaded default function title replaces the title of the button. The default operation ("paste") is selected by deactivating switch 30 on cursor control device 28. The default function is then executed by CPU 14 and thereby avoids the need for a user to choose the command (for example, "paste") from the menu. In addition, the present invention permits a user to select the default operation from any of the button functions displayed on a menu corresponding to a button or a button stack. Accordingly, the present invention provides button stacks and button functions which may be utilized in combination, or separate from, the present invention's previously described method and apparatus for retaining data disposed in a menu. In the present embodiment, to select a default function, a user must place the cursor over the right half of the button stack prior to depressing the cursor control switch. The placement of the cursor over the left half of the button stack and the depression of switch 30, results in the display of the full menu (for example, menu 120) associated with the button stack. However, it will be appreciated that the designation of which portion of the button stack which relates to the default function is a matter of design choice.

Although the present invention has been described with reference to particular window examples in FIGS. 1-7(a)-(c) it will be appreciated by one skilled in the art that the present invention may be implemented in any one of the number of various windows and window configurations on a display system. Similarily, particular button functions illustrated in the figures are only representative of one of many possibilities of button and command configurations which may utilize the present invention. Moreover, it will be understood that the figures are for illustration only and should not be taken as limitations upon the invention. It is contemplated that many changes and modifications may be made, by one of ordinary skill in the art, to the materials and arrangements of the elements of the invention without departing from the sphere and scope of the invention as disclosed above.

We claim:

1. In a computer controlled display system having a display coupled to a central processing unit (CPU) for displaying a plurality of data, said data including at least one button stack, said button stack corresponding to a plurality of menu functions and a default function, a method for choosing and executing said default function such that none of said plurality of menu functions corresponding to said button stack are displayed, said method comprising the steps of:

(a) generating and displaying said button stack on said display, said button stack having a first visual appearance including a button stack title, said button stack having a right area half and a left area half;

(b) positioning a cursor on said display using a cursor control device coupled to said CPU, said cursor being placed on the right area half of said button stack;

(c) providing a first signal to said CPU to denote a selection of said default function, said first signal being generated by a user depressing a switch on said cursor control device;

(d) modifying said button stack from said first visual appearance to a second visual appearance in response to said cursor being placed on the right area half of said button stack and said first signal, said second appearance comprising a title of said default function;

(e) releasing said switch on said cursor control device;

(f) returning said button stack to said first visual appearance and executing said default function;

(g) positioning said cursor on said display using said cursor control device coupled to said CPU, said cursor being placed on the left area half of said button stack:

(h) providing a second signal to said CPU to denote a selection of paid menu function, said second signal being generated by a user depressing said switch on said cursor control device:

(i) generating and displaying a menu list on said display in response to said cursor being placed on the left area half of said button stack and said second signal, said menu list comprising a plurality of menu titles associated with said plurality of menu functions.

2. In a computer controlled display system having a display coupled to central processing unit (CPU) for displaying a plurality of data, said data including at least one button stack, a method for a user to choose and execute a default function associated with said button stack, said method comprising the steps of:

(a) said CPU generating and displaying said button stack on said display, said button stack corresponding to a plurality of menu functions including said default function, said button stack comprising a first portion and a second portion, said button stack having a first visual appearance, said first visual appearance including a first shade;

(b) said user positioning a cursor on said display using a cursor control device coupled to said CPU, said cursor being placed on said first portion of said button stack;

(c) said user providing a first signal to said CPU to denote a selection of said default function, said first signal being generated by said user switching a switch coupled to said CPU from a first position to a second position;

(d) said CPU modifying the first visual appearance of said button stack such that said button stack includes a second shade different from said first shade, and providing an identifier to identify said default function;

(e) said user switching said switch back from said second position to said first position;

(f) said CPU returning said button stack to said button stack's first visual appearance and first shade, and executing said default function;

(g) said user positioning said cursor on said display using said cursor control device, said cursor being placed on said second portion of said button stack;

(h) said user providing a second signal to said CPU to denote a selection of said menu function, said second signal being generated by a user switching said switch coupled to said CPU from said first position to said second position;

(i) said CPU generating and displaying a menu list on said display in response to said cursor being placed on second portion of said button stack and said second signal, said menu list comprising a plurality of menu titles associated with said plurality of menu functions.

3. The method as defined by claim 2 wherein step (d) providing an identifier comprises displaying a title of said default function on said button stack.

4. The method as defined by claim 3 wherein said button stack comprises a right area half and a left area half, said first portion of said button stack comprises said right area half of said button stack, and said second portion of said button stack comprises said left area half of said button stack.

* * * * *